United States Patent [19]

Sawyer

[11] 4,051,625
[45] Oct. 4, 1977

[54] PLANT STARTER

[76] Inventor: George M. Sawyer, 8801 Calico Ave., Garden Grove, Calif. 92641

[21] Appl. No.: 657,927

[22] Filed: Feb. 13, 1976

Related U.S. Application Data

[63] Continuation-in-part of Ser. No. 527,030, Nov. 25, 1974, abandoned.

[51] Int. Cl.² .............................................. A01C 1/00
[52] U.S. Cl. ........................................... 47/14; 47/64
[58] Field of Search ............. 47/1.2, 34, 34 T, 14–16, 47/59–64; 206/461

[56] References Cited

U.S. PATENT DOCUMENTS

| | | | |
|---|---|---|---|
| 1,848,219 | 3/1932 | Kerr | 47/14 |
| 2,026,322 | 12/1935 | Raines | 47/14 X |
| 2,720,725 | 10/1955 | Peerless | 47/14 |
| 2,722,778 | 11/1955 | Carufel | 47/14 |
| 2,884,740 | 5/1959 | Hollander | 47/14 X |
| 2,993,300 | 7/1961 | Sawyer | 47/1.2 |
| 3,125,830 | 3/1964 | Knutsson | 47/14 X |
| 3,177,616 | 4/1965 | Sawyer | 47/14 X |
| 3,199,250 | 8/1965 | Sawyer | 47/1.2 |
| 3,307,693 | 3/1967 | Bittner | 206/461 |
| 3,841,475 | 10/1974 | Ellis | 206/461 |

OTHER PUBLICATIONS

*House Beautiful* vol. 101, No. 5, "The Soybean has all the Answers (or nearly all)" pp. 174–175 by Kalnay, The Bean Sprout, pp. 178–180 by Rinard May 1959, Hearst Corporation, N.Y.
Label of New Tomorrow Scientific Co. Garden Grove, Ca. copyright 1974, etc.

*Primary Examiner*—Edgar S. Burr
*Assistant Examiner*—James R. Feyrer
*Attorney, Agent, or Firm*—William W. Haefliger

[57] ABSTRACT

A seed starter apparatus includes:
 a. a container having a lower portion and a water outlet from said lower portion, and
 b. a resiliently or flexibly self-supporting and water retaining mass of permeable and porous material defining interstices, the material located in the container to support a seed above said outlet, whereby water received in the container will wet said material before slowly draining through said outlet and some of the water will be retained in the interstices of said material to continuously wet the supported surface of the seed and roots will penetrate said interstices to be wetted by water retained in said interstices and to be supported by said material.

2 Claims, 4 Drawing Figures

U.S. Patent  Oct. 4, 1977  4,051,625
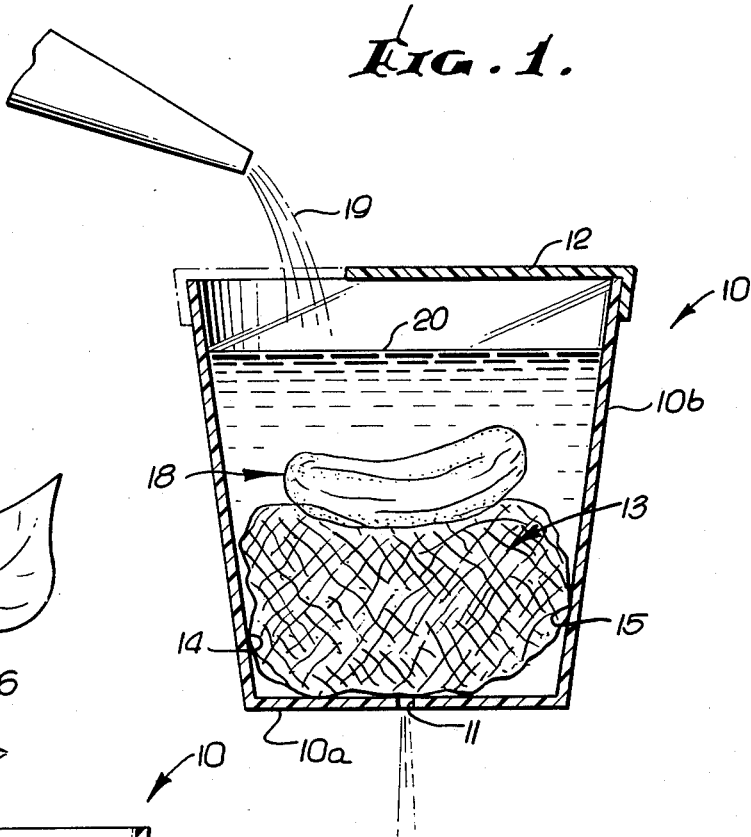
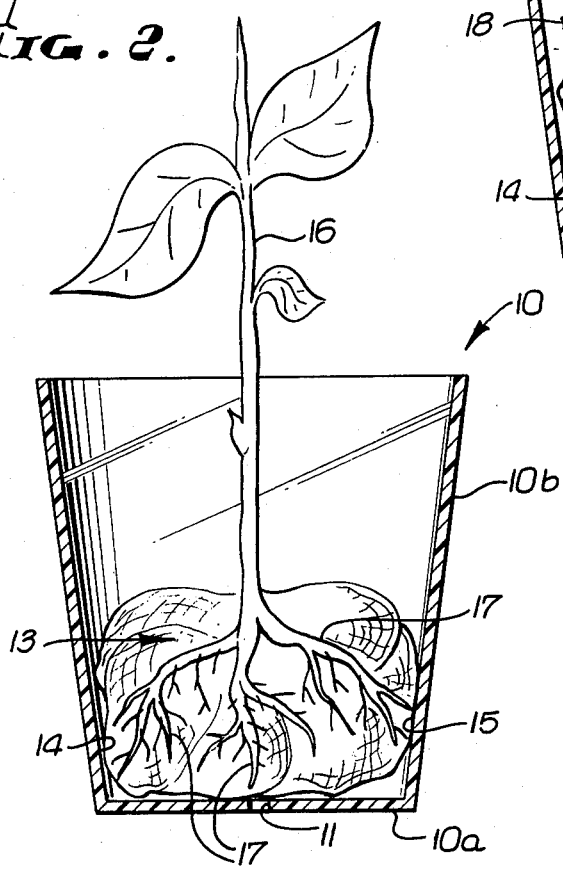
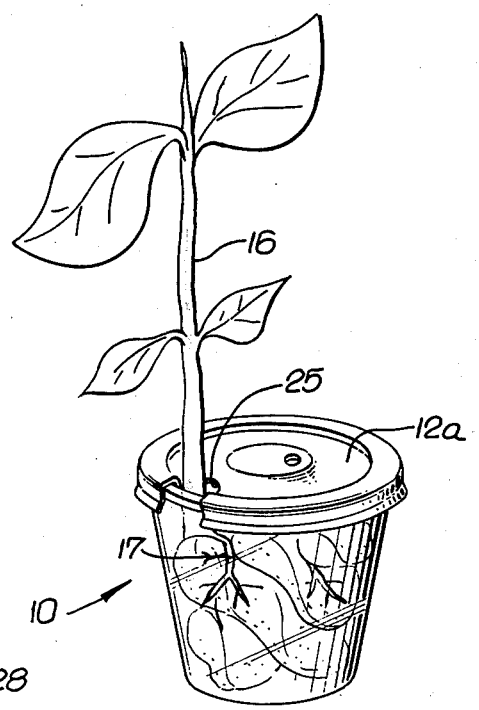
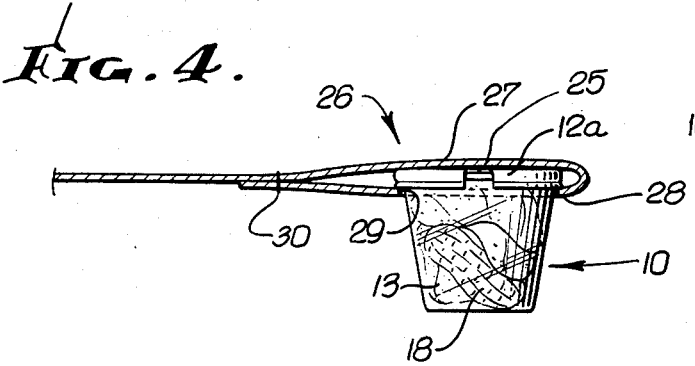

PLANT STARTER

BACKGROUND OF THE INVENTION

This application is a continuation-in-part of my copending application Ser. No. 527,030, filed Nov. 25, 1974 now abandoned.

This invention relates generally to the starting of plants, and more particularly concerns display apparatus and method for germinating seeds using very simple but effective non-earthy materials and procedures, possessing advantages over earthy materials.

There is a need for apparatus to start plants, i.e. germinate seeds, using non-earthy materials. In this regard, soil, particulate etc. is messy, tends to disperse readily and is generally unsatisfactory from a cleanliness standpoint for display germination of seeds. The approach in the past to the filling of this need has been as exemplified in U.S. Pat. No. 2,993,300 to Sawyer; however, that approach is relatively more complex and costly. Thus, there is a need for simple and inexpensive means and apparatus to achieve this objective.

SUMMARY OF THE INVENTION

It is a major object of the invention to provide apparatus and method to meet the described need, and employing a generally monolithic mass of porous material in the manner to be described. Basically, the apparatus employs:

a. a container having a lower portion and a water outlet from said lower portion, and b. a resiliently or flexibly self-supporting and water retaining mass of permeable and porous material defining interstices, the material located in the container to support a seed above said outlet, whereby water received in the container will wet said material before slowly draining through said outlet and some of the water will be retained in the interstices of said material to continuously wet the supported surface of the seed and roots will penetrate said interstices to be wetted by water retained in said interstices and to be supported by said material.

As will be seen, the material may be selected from the group that includes yarn, a mass of synthetic fiber such as acrylic yarn, or a natural fibrous matrix (cotton, wool), etc. Further, the container may have a transparent side wall, a removable cover; and the seed may be loosely supported on the material. In addition, the container may have a bottom wall in which the outlet is formed as a small sized opening to drain the water at such rate that thorough wetting of the container contents is assured, and the container cover may be notched to pass and laterally support a stem.

These and other objects and advantages of the invention, as well as the details of an illustrative embodiment, will be more fully understood from the following detailed description of the drawings, in which:

DRAWING DESCRIPTION

FIG. 1 is a vertical section through seed sprouting apparatus incorporating the invention;

FIG. 2 is a view like FIG. 1, showing the stem and root growth from the supported seed;

FIG. 3 is a perspective showing a modified cover; and

FIG. 4 is an elevation showing a shipment package.

DETAILED DESCRIPTION

The seed sprouting apparatus includes a container, such as is seen at 10 in FIG. 1, having a lower portion and water outlet therefrom. For example, an outlet 11 may be formed in transparent wall 10a of the container. The latter may be formed of transparent colorless thin-walled plastic material, such as polystyrene and vinyl, and a removable cap or cover 12 may be provided as shown, the cap preferably consisting of transparent plastic material. Note that the container annular side wall 10b may flare upwardly from the round bottom wall.

Inserted into the container is a resiliently or flexibly self-supporting water retaining non-particulate mass of porous and permeable material, as for example is designated at 13, the material defining water retaining interstices. The material is typically fibrous and of substantially uniform or consistent fiber texture or size and also substantially coherent. Illustrative of such material are cotton or wool yarn, and a mass of synthetic fiber such as acrylic yarn. Also usable is polyurethane foam as produced by Scott Paper Co., Foam Division, Chester, Pennsylvania.

Thus, the material 13 is non-earthy and non-particulate yet capable of retaining water as by adsorption on the mass or by capillary attraction in and to the interstices formed by the fibers as well as on the seeds. The material 13 is located in the container, as shown, to support a seed above outlet 11, whereby water received in the container will wet the material before slowly draining through the outlet, and some of the water will be retained in the interstices to continuously wet the under supported surface of the seed, and roots growing downwardly from the seed will penetrate the interstices to be wetted by water retained in the interstices. Also, the roots will be supported by the material 13. The latter is in turn supported or braced as by engagement with the wall 10b, as at locations 14 and 15. As a result, the stem 16, seen in FIG. 2, will grow upwardly and not topple due to the support of the roots in a mass 13 which is in turn laterally and under supported as shown. Further, the root filled mass 13 is easily removable from the container for transplanting into the eart. Note the roots 17 shown in FIG. 2.

The seed, which may comprise a peanut seen at 18, is loosely supported or nested in the fibrous mass 13, the peanut shell being wetted by contact with water retained in the latter, as described. Other varieties of seeds may be used, the peanut being an example, only, when water is delivered, as by pouring at 19 into the container, it first fills the container to a level such as at 20, the small size of the outlet 11 preventing immediate loss of water. Therefore, the mass 13 becomes thoroughly wetted, and remains in this condition after slow drainage of most of the water from the outlet 11. Repeated wettings may be effected in this manner, as desired, but the seed will not be "drowned" or over-watered due to the drainage. At the same time, needed water supply to the seed is obtained by contact with the mass 13, whereby root and stem growth are achieved, to most desired effect and purpose.

Preferably, the mass 13 may be artificially colored other than white, as for example dyed (orange, yellow, red etc.) in order to provide high visual contrast making the finest white root hairs visible.

The seed may initially be stored beneath the mass 13, i.e. directly above the bottom wall 10a, with the cover on the container, as during shipment.

As seen in FIG. 1, and also in FIG. 4, the overall length of the peanut shell is approximately the same as the transverse width of the container bottom wall 10a, so that the peanut shell overall length is approximately the same as the transverse length of the container bottom wall.

In FIG. 3, the container cover 12a is peripherally notched at 25 to form an upright opening adjacent the side wall of the container. Accordingly, the removable cover can be replaced so that the notch passes the stem 16 and so that the latter will be closely confined and laterally supported in the notch, between the cover and side wall. The notch is approximately stem size i.e. less than about ¼ inch in cross dimension.

In FIG. 4, the seed or peanut 18 is shown in the container 10 generally below the top level of the yarn-like material 13, the latter extending over the main extent of the seed, for shipment. Thus, the seed is embedded in and below the material. Also, visibility of the seed through the transparent side wall is maintained. The removable cover 12a, notched at 25, is protectively confined between the main extent 27 of a card-board sheet 26, and a sheet flap 28. The latter is fold connected at 29 to the main extent 27, and attached as by staples 30 to the sheet, to closely retain the cover 12a in position for shipment. The tapered container 10 projects through an opening 29 in the flap.

The recipient of the package removes the sheet 26, removes the cover 12a, removes the mass 13 and peanut 18, replaces the mass 13 into the container as a bed, supports the seed on the bed as in FIG. 1, waters the mass and peanut and allows the water to drain as at 1. When the stem grows, the cover is replaced with notch 25 embracing the stem.

I claim:

1. In apparatus for sprouting a seed and in combination with said seed in the form of peanut in a shell,
   a. a self supporting, preformed container having a lower portion and a water outlet from said lower portion, the container having an upstanding side wall which is transparent, and
   b. a resiliently and flexibly fibrous and water retaining mass of permeable, deformable, and porous yarn material defining interstices, the material removably and loosely placed into and located in the container to extend substantially completely across the interior thereof, and supporting the seed abovesaid outlet and in intimate contact with said mass, whereby water received in the container will wet said material before slowly draining through said outlet and some of the water will be retained in the interstices of said material to maintain wet the supported surface of the seed whereby roots will penetrate said interstices to be wetted by water retained in said interstices and to be supported by said material, the seed located centrally of said mass of yarn material and centrally of the container, and the seed seated in a depression formed in said material,
   c. the container side wall closely surrounding the seed sidewardly thereof and extending above the level of the seed and material, the container formed by light passing transparent material, there being a removable cover on the container, the container having a bottom wall and said outlet being formed in said bottom wall, the transverse width of said bottom wall being approximately the same as the shell overall length, the seed extending lengthwise transversely of the container substantially parallel to the bottom wall.

2. In the method of packaging and shipping a seed means in a container and growing a plant therefrom, the seed means having the form of peanut means in a shell, the steps that include
   a. providing a water retaining deformable, fibrous mass of yarn material defining interstices, and confining said material in the container, to extend substantially completely across the upper interior of the container, only,
   b. initially confining the shell at a first level beneath the top of said material for shipment, and subsequently removing the shell from beneath the top of said material and supporting the shell on the top of said material at a second and higher level and centrally of the container and said material so that peanut roots will penetrate into the interstices, and
   c. wetting said material and draining water therefrom and from the container thereby effecting retention of some of the water in said interstices and wetting of the peanut means and roots during upward growing of stem from the peanut means the roots of which are supported by said material.

* * * * *